US009112574B2

(12) United States Patent
Uwamori

(10) Patent No.: US 9,112,574 B2
(45) Date of Patent: Aug. 18, 2015

(54) RELAYING DEVICE AND COMMUNICATION SYSTEM

(71) Applicant: Icom Incorporated, Osaka (JP)

(72) Inventor: Keishiro Uwamori, Osaka (JP)

(73) Assignee: Icom Incorporated, Osaka (JP)

( * ) Notice: Subject to any disclaimer, the term of this patent is extended or adjusted under 35 U.S.C. 154(b) by 62 days.

(21) Appl. No.: 14/062,225

(22) Filed: Oct. 24, 2013

(65) Prior Publication Data

US 2014/0119274 A1    May 1, 2014

(30) Foreign Application Priority Data

Oct. 26, 2012  (JP) ................................. 2012-237252

(51) Int. Cl.
  *H04B 7/14*   (2006.01)
  *H04B 7/155*  (2006.01)
  *H04W 84/04*  (2009.01)

(52) U.S. Cl.
  CPC ............. *H04B 7/155* (2013.01); *H04W 84/047* (2013.01)

(58) Field of Classification Search
  CPC ...................................................... H04B 7/155
  USPC ........................................................ 370/315
  See application file for complete search history.

(56) References Cited

U.S. PATENT DOCUMENTS

| 4,860,359 | A  * | 8/1989  | Eicher ........................... 704/275 |
| 2004/0219940 | A1* | 11/2004 | Kong et al. .................... 455/518 |
| 2008/0021702 | A1* | 1/2008  | Chen et al. ..................... 704/201 |
| 2009/0201949 | A1* | 8/2009  | Sunahara ....................... 370/474 |
| 2009/0245276 | A1* | 10/2009 | Manne ........................... 370/466 |
| 2010/0054498 | A1* | 3/2010  | Sollenberger et al. ......... 381/104 |
| 2011/0076968 | A1* | 3/2011  | Seshadri ..................... 455/114.2 |
| 2011/0081026 | A1* | 4/2011  | Ramakrishnan et al. .... 381/94.3 |

FOREIGN PATENT DOCUMENTS

| JP | 4074633 B    | 6/2006 |
| JP | 2011-135289 A | 7/2011 |
| JP | 2011-135290 A | 7/2011 |
| JP | 2011-135291 A | 7/2011 |

* cited by examiner

*Primary Examiner* — Asad Nawaz
*Assistant Examiner* — Syed S Ali
(74) *Attorney, Agent, or Firm* — Muncy, Geissler, Olds & Lowe, P.C.

(57) ABSTRACT

A relaying device includes a wireless apparatus interface, a signal processing unit connected to the wireless apparatus interface, a network interface, and a packet processing unit connected to the network interface. The relaying device is provided with multiple communication paths including the wireless apparatus interface, the signal processing unit, and the packet processing unit, and each communication path has a mixing unit configured to additively synthesize an uplink audio signal and a downlink audio signal of other communication path to the uplink audio signal and input the synthesized signal to the packet processing unit, and configured to additively synthesize an uplink audio signal and a downlink audio signal of other communication path to the downlink audio signal and input the synthesized signal to the signal processing unit.

6 Claims, 8 Drawing Sheets

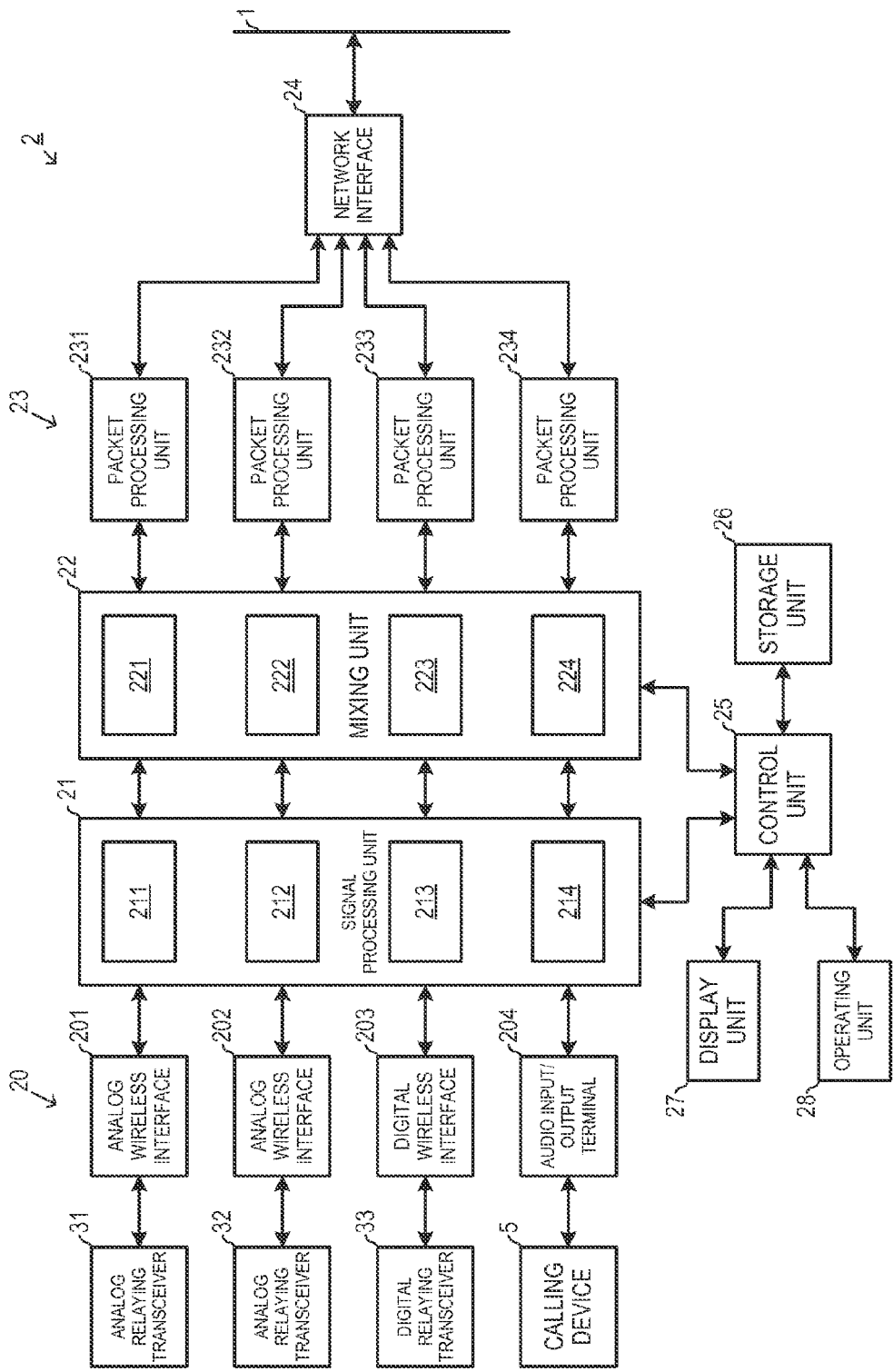

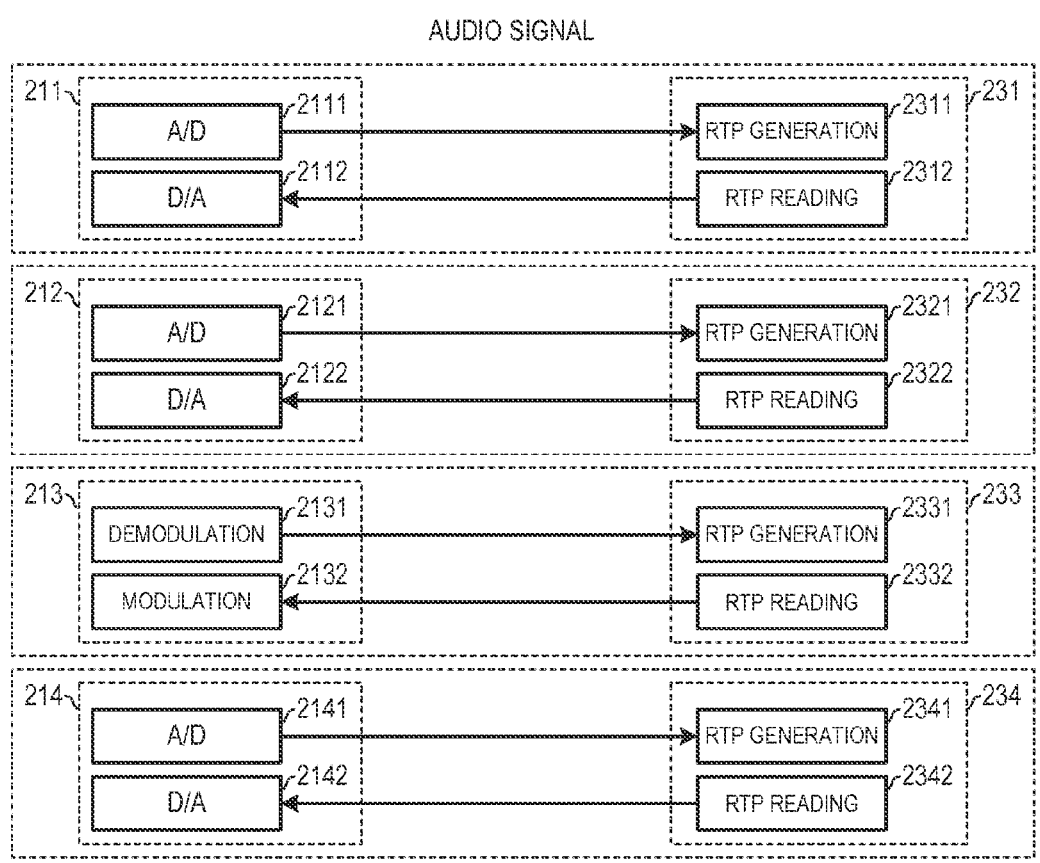

Fig.5

| PORT | MIXING GROUP | | | | |
|---|---|---|---|---|---|
| | BELONGING TO NO GROUP | GROUP1 | GROUP2 | GROUP3 | GROUP4 |
| ANALOG1 | ○ | ● | ○ | ○ | ○ |
| ANALOG2 | ○ | ○ | ● | ○ | ○ |
| DIGITAL1 | ○ | ● | ○ | ○ | ○ |
| DIGITAL2 | ○ | ● | ○ | ○ | ○ |
| DIGITAL3 | ○ | ○ | ● | ○ | ○ |
| DIGITAL4 | ● | ○ | ○ | ○ | ○ |
| AUDIO1 | ○ | ● | ○ | ○ | ○ |
| AUDIO2 | ● | ○ | ○ | ○ | ○ |

RELAYING DEVICE AND COMMUNICATION SYSTEM

BACKGROUND OF THE INVENTION

1. Field of the Invention

The present invention relates to a relaying device and a communication system that relay mutual communications of multiple wireless apparatuses over a network.

2. Description of the Related Art

A relaying device and a communication system have been proposed that relay audio communications of transceivers and the like over a network, so that multiple transceivers in communication areas where radio waves do not reach each other of the transceivers can mutually perform communications (see Japanese Unexamined Patent Application Publication No. 2011-135291, for example).

For a relaying device and a communication system in Japanese Unexamined Patent Application Publication No. 2011-135291 that are configured to enable communications of transceivers in different communication areas, it was a prerequisite that those transceivers are communication equipment of a same communication scheme (analog half-duplex communications, for example). Moreover, even if transceivers are present in a same communication area, their direct communications were not possible if they were transceivers of different communication schemes, such as those of full-duplex communication scheme and of half-duplex communication scheme, those of analog communication scheme and of digital communication scheme, and the like.

SUMMARY OF THE INVENTION

An object of the present invention is to provide a relaying device and a communication system that enable mutual communications of multiple types of wireless apparatuses of different communication schemes.

A relaying device according to the present invention comprises: a wireless apparatus interface to which a wireless relaying apparatus is connected and which receives an audio signal via the wireless relaying apparatus from a wireless handset communicating with the wireless relaying apparatus; a signal processing unit connected to the wireless apparatus interface; a network interface connected to a network which acts as a data communication network and sending or receiving packets to or from other network device connected to the network; and a packet processing unit connected to the network interface. The signal processing unit is configured to output an audio signal inputted from the wireless apparatus interface to the packet processing unit as an uplink audio signal, and output a downlink audio signal inputted from the packet processing unit to the wireless apparatus interface. The packet processing unit is configured to read an audio signal from packets inputted from the network interface and output the audio signal to the signal processing unit as a downlink audio signal, and create a packet from the audio signal inputted from the signal processing unit and output it to the network interface. The relaying device is provided with multiple communication paths including the wireless apparatus interface, the signal processing unit, and the packet processing unit, and each communication path has a mixing unit configured to additively synthesize an uplink audio signal and a downlink audio signal of other communication path to the own uplink audio signal and input the synthesized signal to the packet processing unit, and configured to additively synthesize an uplink audio signal and a downlink audio signal of other communication path to the own downlink audio signal and input the synthesized signal to the signal processing unit.

In the above-described invention, the signal processing unit may be configured to output an uplink audio detection signal to the packet processing unit in parallel with outputting of the uplink audio signal, the packet processing unit may be configured to output a downlink audio detection signal to the signal processing unit in parallel with outputting of the downlink audio signal, and the mixing unit may be configured to input to the packet processing unit a signal generated by ORing an uplink audio detection signal and a downlink audio detection signal of other communication path to the uplink audio detection signal and input a signal generated by ORing an uplink audio detection signal and a downlink audio detection signal of other communication path to the downlink audio detection signal.

In the above-described invention, wireless relaying apparatuses of multiple types of communication schemes which differ from each other may be connected to wireless apparatus interfaces of multiple communication paths.

In the above-described invention, the relaying device may further include a selection unit that uses the mixing unit and selects whether or not to cause the mixing unit to mutually perform additive synthesis of an audio signal or ORing of an audio detection signal or that selects a communication path of multiple communication paths that uses the mixing unit to mutually perform additive synthesis of the audio signal or ORing of the audio detection signal.

In addition, the selection unit may be configured to make the selection on the basis of a signal from a wireless handset inputted via the wireless apparatus interface.

A communication system of the present invention includes the relaying device described above; multiple wireless relaying apparatuses connected to multiple communication paths; and multiple wireless handsets. Each wireless handset communicates with any of the multiple wireless relaying apparatuses. An audio signal sent by one wireless handset is conveyed via the relaying device to the other wireless handsets.

Furthermore, multiple communication systems described above are provided, a relaying device in each of the communication systems is connected to a network, and each relaying device sends or receives packets via a network interface.

According to the present invention, even wireless apparatuses (wireless handsets) of different communication schemes can communicate with each other via a wireless apparatus interface and a mixing unit, and at the same time, communications over a network are also enabled via a network interface.

BRIEF DESCRIPTION OF THE DRAWINGS

FIG. 2 is a block diagram of the relaying device in the communication system.

FIG. 3A shows a configuration of a signal processing unit, a mixing unit, and a packet processing unit when a mixing function of the relaying device is turned off.

FIG. 4A shows a configuration of the signal processing unit, the mixing unit, and the packet processing unit when the mixing function of the relaying device is turned on.

FIG. 4B shows a configuration of the signal processing unit, the mixing unit, and the packet processing unit when the mixing function of the relaying device is turned on.

FIG. 5 shows a display example of a screen for setting a mixing group.

DESCRIPTION OF THE PREFERRED EMBODIMENTS

Figure 1:
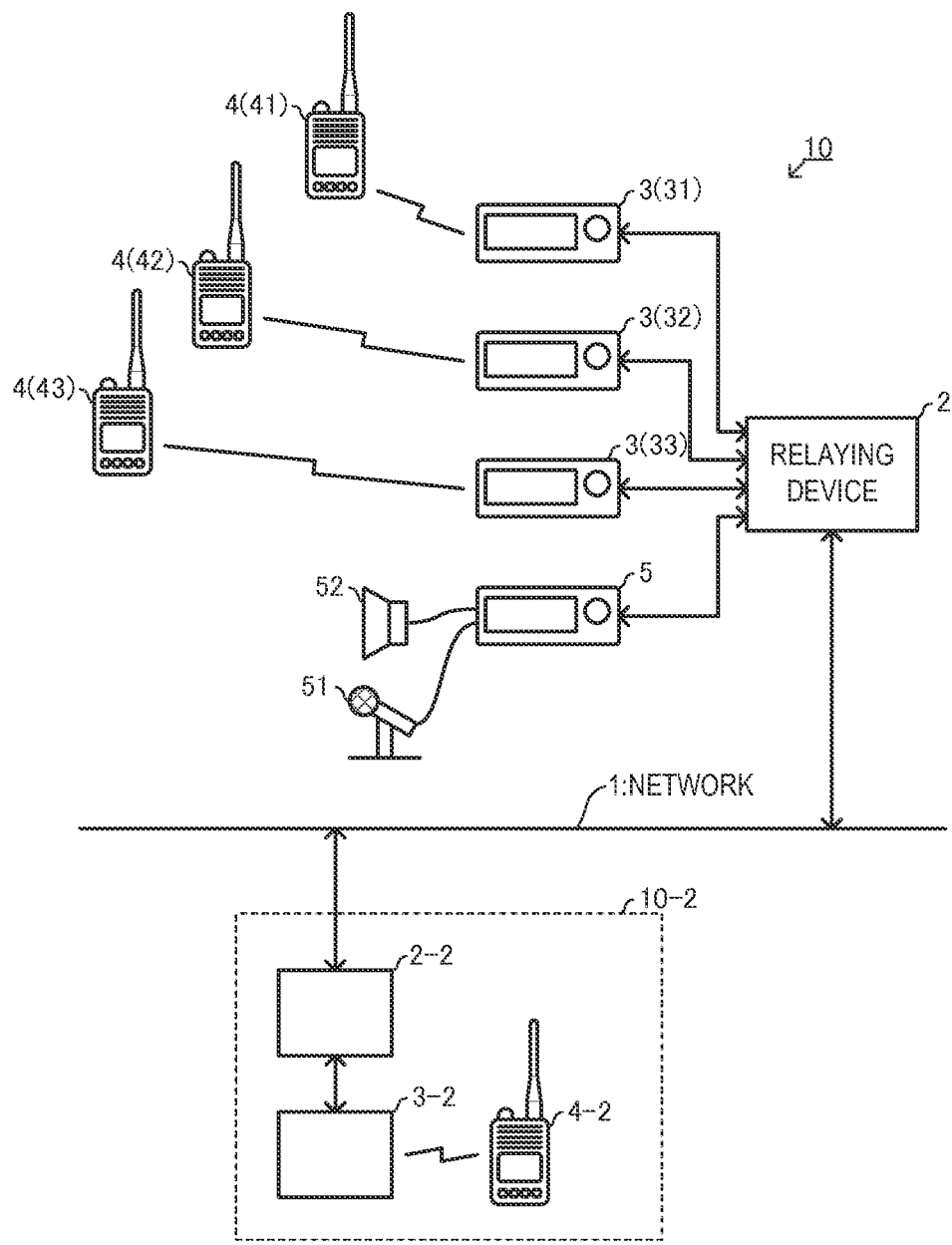
FIG. 1 shows a configuration of a communication system according to an embodiment of the present invention.
Figure 3B:
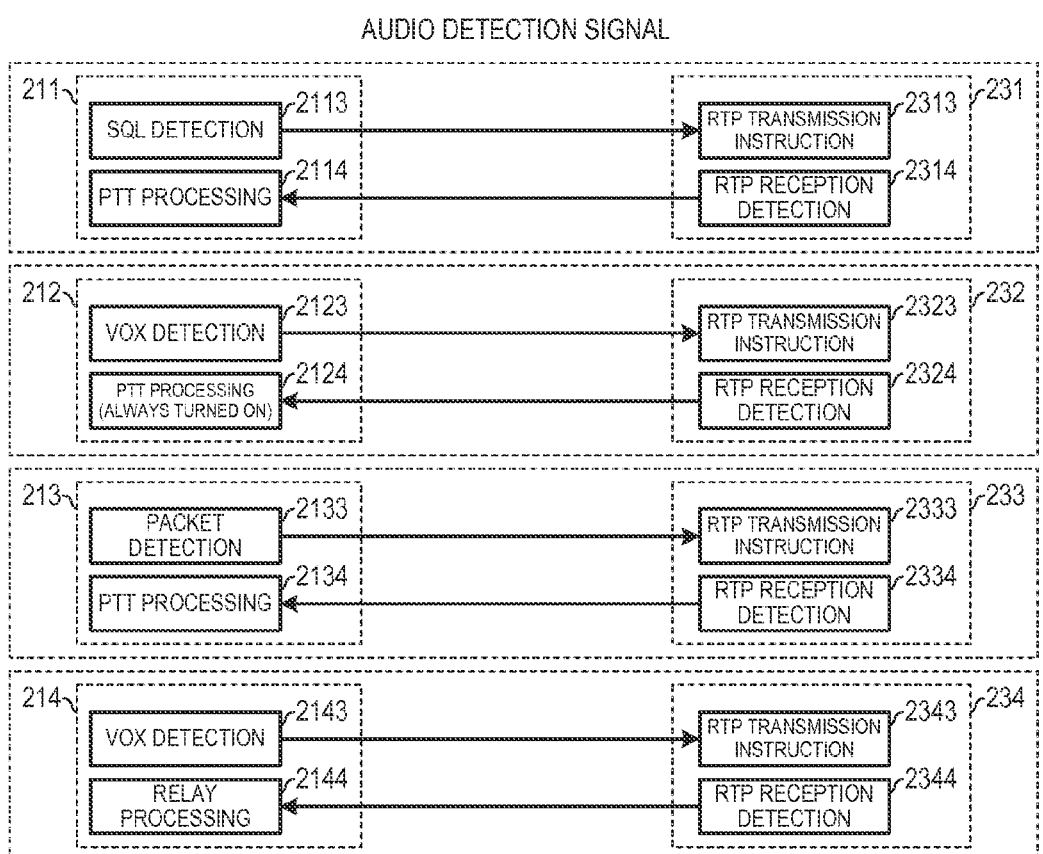
FIG. 3B shows a configuration of a signal processing unit, a mixing unit, and a packet processing unit when a mixing function of the relaying device is turned off.

Hereinafter, a description will be given of a relaying device and a communication system according to an embodiment of the present invention, with reference to the accompanying drawings. FIG. 1 is a configuration diagram of a communication system 10 according to the embodiment of the present invention. FIG. 2 is a block diagram of a relaying device 2 according to the embodiment of the present invention. In addition, FIGS. 3A and 3B show configurations of a signal processing unit 21, a mixing unit 22, and a packet processing unit 23 of the relaying device 2.

The relaying device 2 of the communication system 10 relays wireless communications of transceivers 4 (41, 42, 43) over a network 1. For example, the relaying device 2 relays communications between the transceiver 41 in the figure and a transceiver 4-2 under the control of a relaying device 2-2 of other communication system 10-2.

As shown in FIG. 2, the relaying device 2 has one network interface 24 and multiple wireless apparatus interfaces 20 (201, 202, 203, 204). The wireless apparatus interfaces 201, 202 are analog wireless apparatus interfaces, to each of which a half-duplex (simplex) relaying transceiver 31 or a duplex (full-duplex) relaying transceiver 32 is connected. The half-duplex relaying transceiver 31 communicates with a user transceiver 41, which is also half-duplex and used by a user. The full-duplex relaying transceiver 32 communicates with a user transceiver 42 which is also full-duplex and used by a user.

A half-duplex transceiver is a transceiver configured to be switched by a user to either a transmission mode or reception mode, as appropriate. The half-duplex transceiver comprises a push-to-talk (Push to Talk: PTT) switch or a VOX circuit, and is switched to the transmission mode when the PTT switch is turned on, when the VOX circuit detects user's voice, or when a PTT signal is externally inputted. In addition, a full-duplex transceiver is a transceiver configured to be able to perform transmission and reception in parallel by causing a transmission circuit and a reception circuit to operate on different channels (frequencies) in parallel. Thus, half-duplex transceivers and full-duplex transceivers cannot wirelessly communicate with each other since their communication schemes are different.

The wireless apparatus interface 203 is a digital wireless apparatus interface, to which a digital relaying transceiver 33 is connected. The digital relaying transceiver 33 communicates with the digital user transceiver 43 used by the user. The wireless apparatus interface 204 is an audio input/output terminal, to which a calling device 5 that is not a wireless apparatus is connected. The calling device 5 comprises a microphone 51 and a speaker 52 and is operated directly by an operator.

The digital transceiver 43 is a transceiver configured to digitalize an audio signal and send or receive it with a modulation scheme such as PSK (Phase-shift-keying) and the like. Obviously, the digital transceiver 43 and an analog transceiver cannot wirelessly communicate with each other.

An audio signal inputted from the transceiver 4 or the calling device 5 via the wireless apparatus interface 20 is converted into an RTP packet by the signal processing unit 21, the mixing unit 22, and the packet processing unit 23, to be described below, and sent to the network 1 from the network interface 24. The network interface 24 also receives an RTP packet from a communication partner on the network 1. The RTP packet received by network interface 24 is converted into an audio signal by the packet processing unit 23, the mixing unit 22, and the signal processing unit 21 described above, and inputted to each wireless apparatus interface 20.

To the network 1 is connected one or more communication systems 10-2, in addition to the communication system 10. The relaying devices 2, 2-2 of each communication system 10, 10-2 communicate with each other and exchange RTP (Real-time Transport Protocol) packets carrying audio call signaling of the transceivers 4, 4-2. The network 1 may employ a LAN configured by Ethernet™ or the Internet.

While four paths of the analog wireless apparatus interfaces 201, 202, the digital wireless apparatus interface 203, and the audio input/output terminal 204 are provided as the wireless apparatus interface 20 in the embodiment, any number of wireless apparatus interfaces may be provided. In addition, any number of the analog wireless apparatus interface, the digital wireless apparatus interface, and the audio input/output terminal may be combined. For example, two paths of the analog wireless apparatus interfaces, four paths of the digital wireless apparatus interfaces, or two paths of the audio input/output terminals may be provided.

Figure 4A:
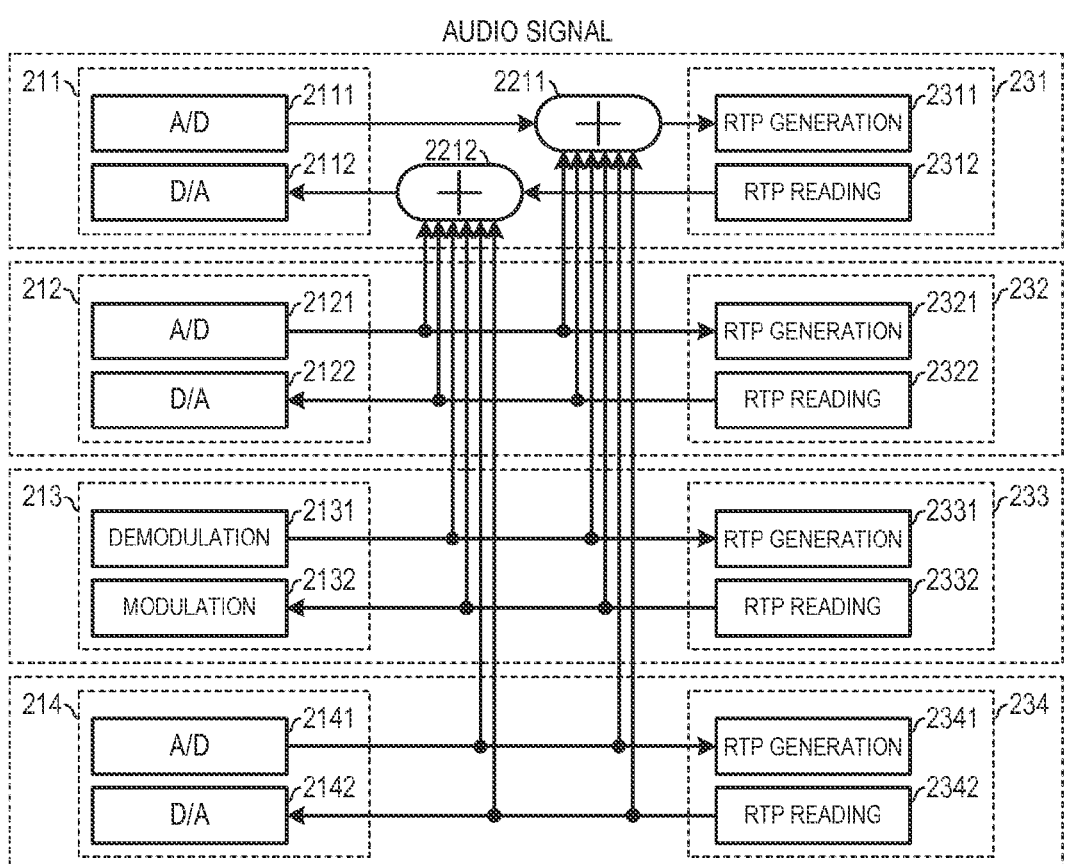
Figure 4B:
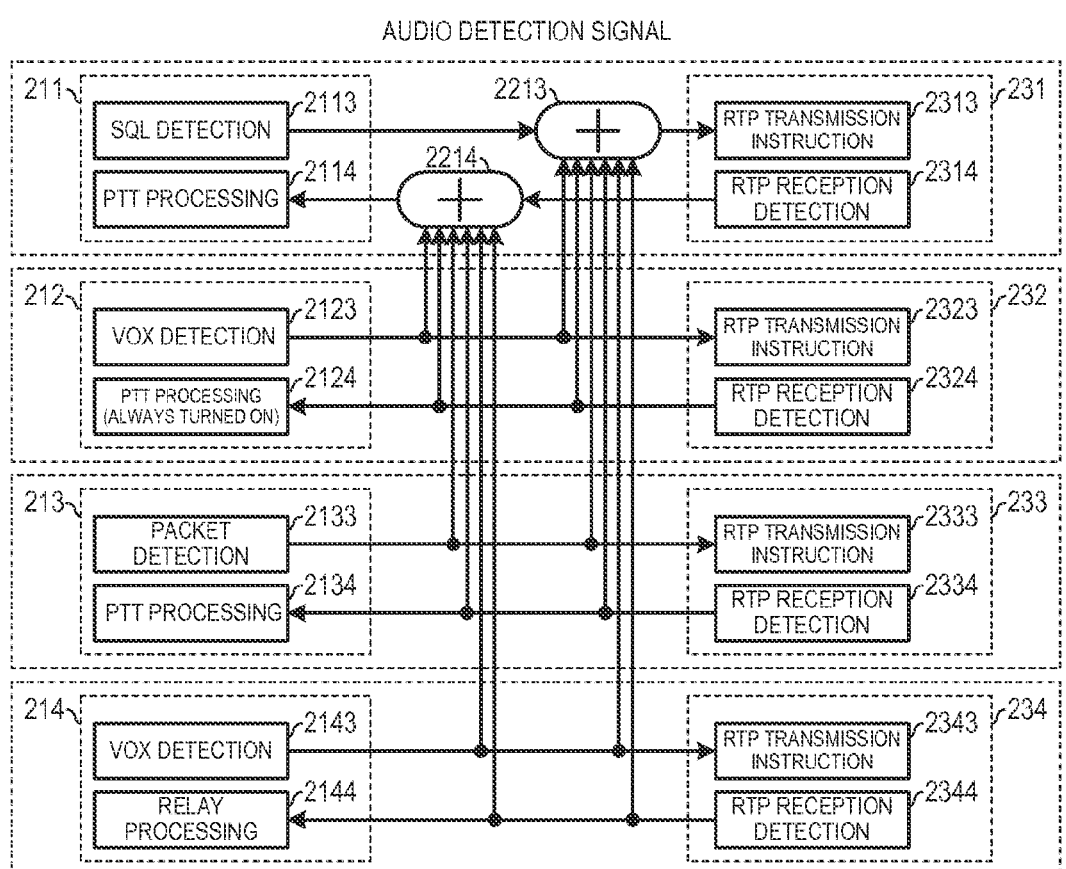

FIGS. 3A, 3B, 4A, and 4B show configurations of the signal processing unit 21, the mixing unit 22, and the packet processing unit 23 of the relaying device 2. FIGS. 3A and 3B show connection form when the mixing function is off, and FIGS. 4A and 4B show one example of the connection form when the mixing function is on.

The signal processing unit 21 consists of signaling processing units 211, 212, 213, 214 associated with the four wireless apparatus interfaces 201, 202, 203, 204. The mixing unit 22 consists of mixing units 221, 222, 223, 224 associated with the four wireless apparatus interfaces 201, 202, 203, 204. The packet processing unit 23 also consists of packet processing units 231, 232, 233, 234 associated with the four wireless apparatus interfaces 201, 202, 203, 204.

As shown in FIG. 3A and FIG. 4A, the signal processing unit 21 (211, 212, 213, 214) processes an audio signal of audio communications, and as shown in FIG. 3B and FIG. 4B, processes a control signal for switching transmission and reception of a wireless apparatus.

The analog wireless apparatus interface 201, the analog signal processing unit 211, the mixing unit 221, and the packet processing unit 231 constitute a first communication path, while the analog wireless apparatus interface 202, the analog signal processing unit 212, the mixing unit 222, and the packet processing unit 232 constitute a second communication path. The digital wireless apparatus interface 203, the digital signal processing unit 213, the mixing unit 233, and the packet processing unit 233 constitute a third communication path. Furthermore, the audio input/output terminal 204, the analog signal processing unit 214, the mixing unit 224, and the packet processing unit 234 constitute a fourth communication path.

When the mixing function is turned off, each communication path operates independently, as shown in FIGS. 3A and 3B. In contrast, when the mixing function is turned on, an audio signal and a control signal (audio detection signal) of each communication path are additively synthesized mutually, and outputted from each communication path, as shown in FIGS. 4A and 4B. Note that although FIGS. 4A and 4B only show the connection form of the mixing unit 221 of the first communication path, the mixing units 222, 223, 224 also mix and output an audio signal and a control signal (audio detection signal) of each path in a similar connection form.

To the analog signal processing 211 is connected the half-duplex analog relaying transceiver 31 via the analog wireless apparatus interface 201. The analog signal processing unit 211 comprises an A/D converter 2111 that converts an analog audio signal inputted from the analog relaying transceiver 31 into a digital signal for an RTP packet, and a D/A converter 2112 that converts an audio signal to be outputted to the analog relaying transceiver 31 into an analog signal. The analog signal processing unit 211 also comprises an SQL detection unit 2113 that generates a control signal (audio detection signal) signifying that an audio signal is present, when a squelch signal (SQL) is inputted from the analog relaying transceiver 31, and a PTT processing unit 2114 that outputs a PTT signal to the analog relaying transceiver 31 when an audio detection signal is inputted from other processing unit.

To the analog signal processing unit 212 is connected the full-duplex analog transceiver 32 via the analog wireless apparatus interface 202. The analog signal processing unit 212 comprises an A/D converter 2121 that converts an analog audio signal inputted from the analog relaying transceiver 32 into a digital signal for an RTP packet, and a D/A converter 2122 that converts an audio signal to be outputted to the analog relaying transceiver 32 into an analog signal. The analog signal processing unit 212 also includes a VOX detection unit 2123 which detects that an audio signal is inputted from the full-duplex analog relaying transceiver 32 which does not generate a squelch signal, and which generates an audio detection signal when detecting that the audio signal is inputted, and a PTT processing unit 2124 which always turns on a PTT signal and always allows output of an audio signal to the D/A converter 2022.

To the digital signal processing unit 213 is connected the (half-duplex) digital relaying transceiver 33 via the digital wireless apparatus interface 203. The digital signal processing 213 includes a demodulation unit 2131 that converts a digital audio signal inputted from the digital relaying transceiver 33 into a digital signal for an RTP packet, and a modulation unit 2132 that converts a digital signal for an RTP packet inputted from other processing unit into a digital audio signal in a compression format to be outputted to the digital relaying transceiver 33. The digital signal processing unit 213 also includes a packet detection unit 2133 that generates an audio detection signal when a packet carrying an audio signal is inputted from the digital relaying transceiver 33, and a PTT processing unit 2134 that generates a PTT signal to the digital relaying transceiver 33 when an audio detection signal is inputted from other processing unit.

To the analog signal processing unit 214 is connected the calling device 5 via the audio input/output terminal 204. The analog signal processing unit 214 includes an A/D converter 2141 that converts an analog audio signal inputted from the calling device 5 into a digital signal for an RTP packet, and a D/A converter 2142 that converts an audio signal to be outputted to the calling device into an analog signal. The analog signal processing unit 214 also includes a VOX detection unit 2143 which detects that an audio signal is inputted from the microphone 51 and generates an audio detection signal, and a relay processing unit 2144 which turns off the microphone 51 and turns on the speaker 52 when an audio detection signal is inputted from other processing unit.

When an audio detection signal is inputted, the packet processing unit 23 (231, 232, 233, 234) generates an RTP packet on the basis of the audio signal then inputted, and sends it. When an RTP packet is received from the network 1, the packet processing unit 23 generates an audio detection signal and outputs an audio signal contained in that RTP packet. The packet processing units 231, 232, 233, 234 respectively send or receive an RTP packet via the network interface 24 with a communication partner on the network 1 which is either predetermined or selected and set by the user.

FIGS. 4A and 4B show the connection form of the mixing unit 21 when the mixing function is turned on. Note that although FIGS. 4A and 4B only show the connection form of the mixing unit 221 of the first communication path, the mixing units 222, 223, 224 also mix and output an audio signal and an audio detection signal of each path in a similar connection form.

The mixing unit 221 has adders 2211, 2212 that additively synthesize audio signals and adders 2213, 2214 that OR audio detection signals.

The adder 2211 additively synthesizes audio signals inputted from the A/D converter 2111, the A/D converter 2121, the demodulation unit 2131, the A/D converter 2141, and RTP reading units 2322, 2332, 2342. The adder 2211 inputs the audio signal to an RTP packet generation unit 2311 of the packet processing unit 231 as an uplink audio signal. Specifically, the adder 2211 additively synthesizes all audio signals to be outputted from any unit other than the packet processing unit 231 (RTP packet reading unit 2312), which is a destination of audio signals to be inputted, to generate an uplink audio signal. It is to prevent echo or acoustic feedback that an audio signal outputted from the destination packet processing unit 231 is not added.

The adder 2212 additively synthesizes audio signals inputted from the A/D converter 2121, the demodulation unit 2131, the A/D converter 2141, and the RTP packet reading units 2312, 2322, 2332, 2342. The adder 2212 inputs the audio signal to the D/A converter 2112 of the signal processing unit 211 as a downlink audio signal. Specifically, the adder 2212 additively synthesizes all audio signals to be outputted from any unit other than the signal processing unit 211 (A/D converter 2111), which is a destination of audio signals to be inputted, to generate an uplink audio signal. It is to prevent echo or acoustic feedback that an audio signal outputted from the destination signal processing unit 211 is not added.

The adder 2213 for ORing audio detection signals ORs audio detection signals inputted from the SQL detection unit 2113, the VOX detection unit 2123, the packet detection unit 2133, the VOX detection unit 2143, and RTP packet reception detection units 2324, 2334, 2344. Then, the adder 2213 inputs the ORed audio detection signal to an RTP packet transmission instruction unit 2313 of the packet processing unit 231. With this, the above-described uplink audio signal generated by the adder 2211 is outputted from the RTP packet generation unit 2311 to the network interface 24.

The adder 2214 ORs audio detection signals to be inputted from the VOX detection unit 2123, the packet detection unit 2133, the VOX detection unit 2143, and the RTP packet reception detection units 2314, 2324, 2334, 2344. Then, the adder 2214 inputs the ORed audio detection signal to the PTT processing unit 2114 of the signal processing unit 211. With this, the above-described downlink audio signal generated by the adder 2212 is inputted from the RTP packet generation unit 2311 via the wireless apparatus interface 201 to the relaying transceiver 31, and sent to the user transceiver 41.

With the processing of the mixing unit 22 as described above, uplink and downlink audio signals of all paths to be mixed are additively synthesized and sent to the transceiver 4 of each path. Thus, mutual communications of multiple units beyond differences in models is enabled.

Alternatively, in the relaying device 2, all communication paths may become a target of mixing when the mixing function is turned on or the user may be allowed to select which communication path is to be mixed.

Here, in FIG. 2, the control unit 25 is connected to the signal processing unit 21 and the mixing unit 22. To the control unit 25 are connected a storage unit 26, a display unit 27, and an operating unit 28. In the storage unit 26 is stored information on selection of a signal processing path (mixing group) of multiple signal processing paths that mutually performs mixing when the mixing function is turned on. Based on an indication on the display unit 27, the user can operate the operating unit 28 to set a mixing group.

In a mixing group setting mode, the display unit 27 displays a setting screen as shown in FIG. 5. By operating the operating unit 28 to turn on or off a radio button, the user can select a mixing group to which each communication path belongs. Then, the setting is stored in the storage unit 26. In an operation mode, the user turns on the mixing function, selects a mixing group, and operates the mixing function.

Alternatively, a tone signal such as a DTMF signal or a 5-tone signal may be inputted from the transceiver 4 (41, 42, 43), and the tone signal may thereby enable turning on or off of the mixing function, selection of a mixing group, or setting of a mixing group.

Figure 6A:
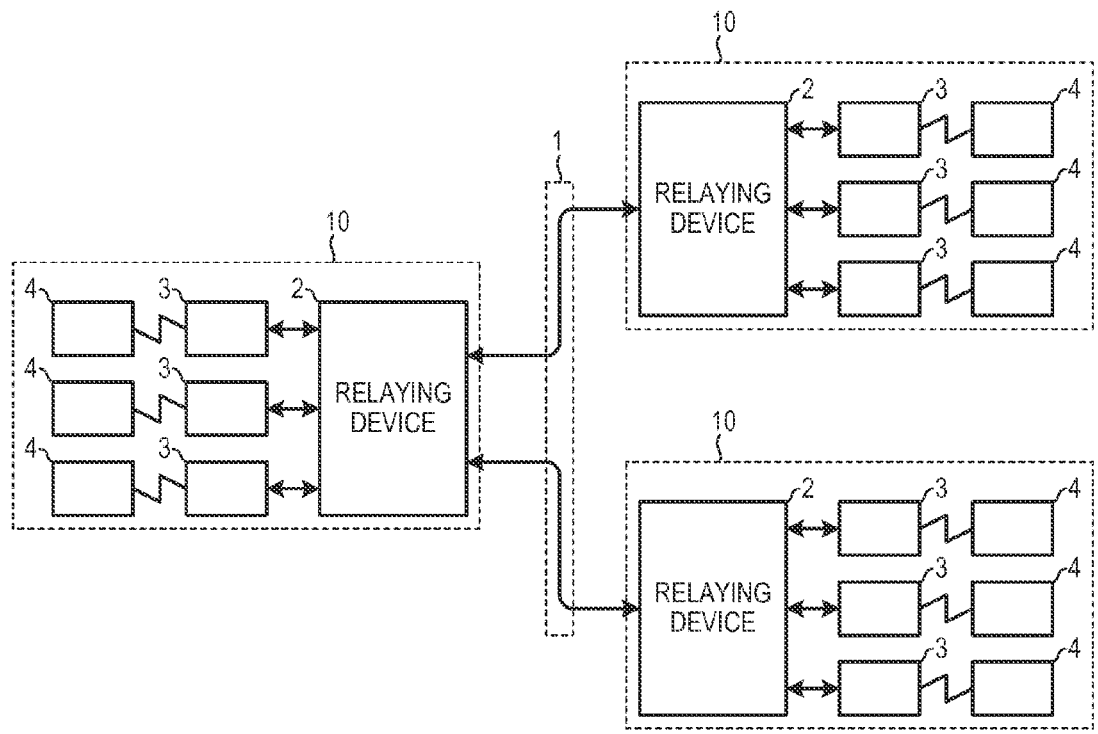
FIG. 6A is an illustration showing a form of cooperation of multiple communications system.

In addition, as shown in FIG. 6A, mutually connecting multiple communication systems 10 having the configuration described above enables so-called multiple connections or daisy-chain connection of the communication systems 10, thereby enabling wide-ranging mutual communications beyond communication areas.

Figure 6B:
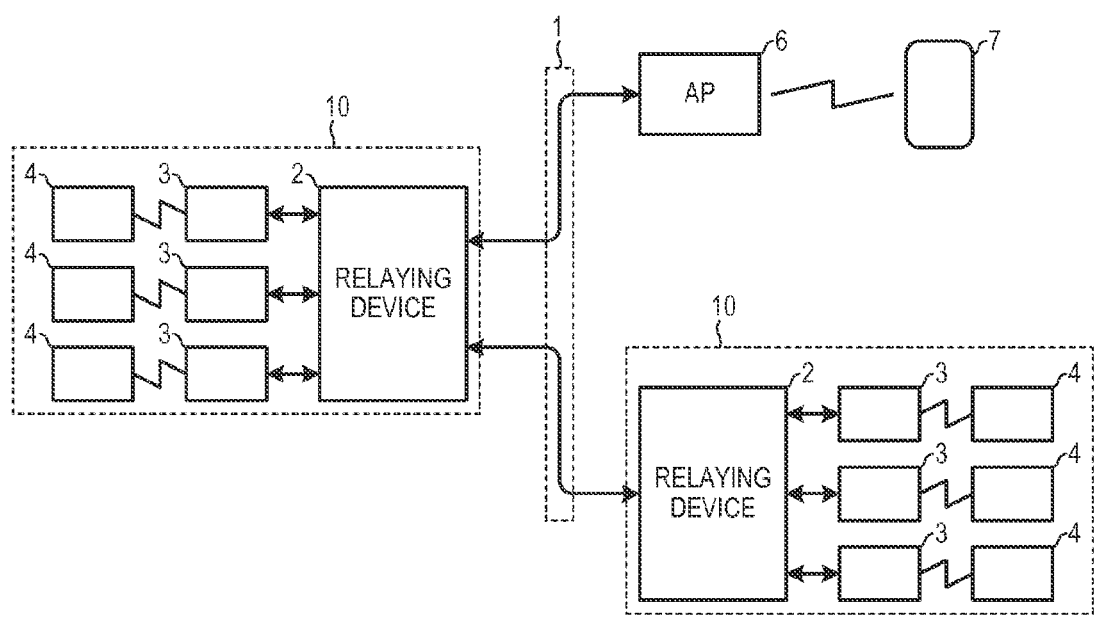
FIG. 6B is an illustration showing a form of cooperation of multiple communications system.

In addition, as shown in FIG. 6B, a multi-function mobile phone (smart phone) 7, which is allowed for transmission or reception of RTP packets by arranging a wireless access point 6 on the network 1, is enabled to access to the network 1. Then, a communication partner of any of the communication paths of the relaying device 2 is set to the multi-function mobile phone 7, which is thereby added to a group of mutual communications and can be used as a so-called headset.

In the above embodiment, the signal processing unit 21 and the packet processing unit 24 are configured to output an audio detection signal in parallel with outputting of an audio signal. However, a unit that inputs an audio signal may check a signal level to be inputted to perform VOX processing (generating a PTT signal), rather than a unit that outputs an audio signal outputting an audio detection signal.

REFERENCE NUMERALS 1 network
2 relaying device
3 (31, 32, 33) relaying transceiver
4 (41, 42, 43) user transceiver (wireless handset)
6 wireless access point
7 multi-function mobile phone (smart phone)
20 wireless apparatus interface
21 signal processing unit
22 mixing unit
23 packet processing unit
24 network interface
25 control unit
26 storage unit
27 display unit
28 operating unit

What is claimed is:

1. A relaying device for wireless communication, the relaying device comprising:
a transceiver interface connected to a transceiver which receives an audio signal from a wireless handset and transfers the audio signal to a signal processor;
wherein the signal processor is connected to the transceiver interface;
a network interface connected to a network which acts as a data communication network for sending or receiving packets to or from other network devices connected to the network; and
a packet processor connected to the network interface;
wherein the signal processor outputs the audio signal inputted from the transceiver interface to the packet processor as an uplink audio signal, and the signal processor outputs a downlink audio signal inputted from the packet processor to the transceiver interface;
wherein the packet processor reads a second audio signal contained within a second audio packet inputted from the network interface and outputs the second audio signal to the signal processor as the downlink audio signal, and the packet processor creates a first audio packet from the uplink audio signal and outputs the first audio packet to the network interface;
wherein the relaying devices communicates to a plurality of devices through a plurality of communication paths, including paths stemming from the transceiver interface, the signal processor, and the packet processor, and
each communication path including a mixer that additively synthesizes a first uplink audio signal and a downlink audio signal of other communication paths to the own uplink audio signal and inputs the synthesized signal to the packet processor, and additively synthesizes a second uplink audio signal and a downlink audio signal of other communication paths to the own downlink audio signal and inputs the synthesized signal to the signal processor,
the signal processor outputs an uplink audio detection signal to the packet processor in parallel with outputting of the uplink audio signal,
the packet processor outputs a downlink audio detection signal to the signal processing unit in parallel with outputting of the downlink audio signal, and
the mixer inputs to the packet processor a signal generated by ORing an uplink audio detection signal of other communication paths and a downlink audio detection signal of other communication paths to the uplink audio detection signal of the current path, and
the mixer inputs a signal generated by ORing an uplink audio detection signal and a downlink audio detection signal of other communication paths to the downlink audio detection signal of other communication paths.

2. The relaying device according to claim 1, wherein transceivers of multiple types of communication schemes which differ from each other are connected to some of the transceiver interfaces of the plurality of communication paths.

3. The relaying device according to claim 1 further comprising: a first selector selecting whether or not to cause the mixer to the synthesis of the audio signal and the ORing of the audio detection signal or a second selector selecting a communication path of the plurality of communication paths for synthesizing the audio signal and ORing the audio detection signal.

4. The relaying device according to claim 3 wherein the first and second selectors make the selection on the basis of a signal from the wireless handset inputted via the transceiver interface.

5. A communication system comprising:
the relaying device according to claim 1; a plurality of transceivers connected to the plurality of communication paths; and a plurality of wireless handsets, each communicating with any of the plurality of wireless relaying apparatuses, wherein an audio signal sent by one wireless handset of the plurality of wireless handsets is conveyed via the relaying device to the remaining of the plurality of wireless handsets excluding the one wireless handset.

6. A communication system, wherein a plurality of communication systems according to claim 5 are provided, a relaying device in each of the communication systems is connected to the network, and each relaying device sends or receives the packets via the network interface.

* * * * *